(12) United States Patent
Banister

(10) Patent No.: US 7,224,758 B1
(45) Date of Patent: May 29, 2007

(54) MULTIPLE TRANSMIT ANTENNA WEIGHTING TECHNIQUES

(75) Inventor: Brian C. Banister, San Diego, CA (US)

(73) Assignee: VIA Telecom Co., Ltd. (KY)

( * ) Notice: Subject to any disclaimer, the term of this patent is extended or adjusted under 35 U.S.C. 154(b) by 783 days.

(21) Appl. No.: 10/197,965

(22) Filed: Jul. 16, 2002

Related U.S. Application Data

(63) Continuation-in-part of application No. 10/080,751, filed on Feb. 22, 2002, and a continuation-in-part of application No. 10/080,728, filed on Feb. 22, 2002, and a continuation-in-part of application No. 10/076,925, filed on Feb. 14, 2002.

(60) Provisional application No. 60/346,130, filed on Oct. 29, 2001, provisional application No. 60/308,474, filed on Jul. 27, 2001, provisional application No. 60/278,501, filed on Mar. 23, 2001.

(51) Int. Cl.
  *H04L 7/00* (2006.01)
(52) U.S. Cl. .................................................. 375/358
(58) Field of Classification Search ................ 375/267, 375/347, 349, 144, 148, 358; 455/500, 553.1, 455/132; 370/249; 708/314, 322, 323, 505, 708/670
  See application file for complete search history.

(56) References Cited

U.S. PATENT DOCUMENTS

| | | | | |
|---|---|---|---|---|
| 6,141,393 | A * | 10/2000 | Thomas et al. | 375/347 |
| 6,373,881 | B1 * | 4/2002 | Mizuguchi et al. | 375/147 |
| 6,434,366 | B1 * | 8/2002 | Harrison et al. | 455/69 |
| 6,728,307 | B1 * | 4/2004 | Derryberry et al. | 375/219 |
| 6,950,457 | B2 * | 9/2005 | Choi | 375/148 |

OTHER PUBLICATIONS

Derryberry, et al. (Nokia), "Transmit Adaptive Arrays without User Specific Pilot", Aug. 1999.

Banister, et al., "A Stochastic Gradient Algorithm for Transmit Antenna Weight Adaptation with Feedback", Workshop on Signal Processing Advances in Wireless Communications, Mar. 2001.

Banister, et al., "Tracking Peformance of a Stochastic Gradient Algorithm for Transmit Antenna Weight Adaptation with Feedback", International Conference on Acoustics, Speech and Signal Processing, May 2001.

(Continued)

*Primary Examiner*—Khanh Tran
*Assistant Examiner*—Sam K. Ahn
(74) *Attorney, Agent, or Firm*—Kirkpatrick & Lockhart Preston Gates Ellis LLP

(57) ABSTRACT

Provided are techniques for the adjustment of antenna transmission weighting values in a communications system that utilizes multiple transmit antennas. A first signal is transmitted on a first multiplex channel via the multiple transmit antennas using a set of transmission weighting values. A second signal is transmitted on a second multiplex channel (different than the first channel) via the multiple transmit antennas using a set of perturbation weighting values. Then, a response that indicates at least one of: whether the set of perturbation weighting values should be added to the set of transmission weighting values and whether the set of perturbation weighting values should be subtracted from the set of transmission weighting values is received from a receiver of the first and second signals. Finally, a new set of transmission weighting values is generated based on the received response.

33 Claims, 4 Drawing Sheets

OTHER PUBLICATIONS

Harrison (Motorola), "TX AA Parameter Recommendations", Sep. 1999.

Harrison, et al. (Motorola), "Open and Closed Loop Transmit Diversity at High Data Rates on 2 and 4 Elements", Aug. 1999.

Liang, et al., "Forward Link Antenna Diversity Using Feedback for Indoor Communication Systems", Proceedings of International Conference on Acoustics, Speech and Signal Processing, May 1995, pp. 1753-1755.

Liang, et al., "Transmit Antenna Array Techniques for Cellular CDMA Systems", Proceedings of the Ninth International Symposium on Personal, Indoor, and Mobile Radio Communications, Sep. 1998, pp. 1396-1400.

Rashid-Farrokhi, et al., "Transmit Beamforming and Power Control for Cellular Wireless Systems", IEEE Journal on Selected Areas in Communications, vol. 16, No. 8, Oct. 1998.

* cited by examiner

MULTIPLE TRANSMIT ANTENNA WEIGHTING TECHNIQUES

This application is a Continuation-In-Part of U.S. patent application Ser. No. 10/080,751 filed on Feb. 22, 2002; U.S. patent application Ser. No. 10/076,925 filed on Feb. 14, 2002; and U.S. patent application Ser. No. 10/080,728 filed on Feb. 22, 2002, all of which claim priority to U.S. Provisional Patent Application Ser. No. 60/278,501 titled "Method and System for Perturbation Pilot for Gradient Feedback Transmit Antenna Array Adaptation" filed on Mar. 23, 2001. This application also claims priority to U.S. Provisional Patent Application Ser. No. 60/308,474 filed on Jul. 27, 2001, and to U.S. Provisional Patent Application Ser. No. 60/346,130 titled "Method and System for Perturbation Pilot for Gradient Feedback Transmit Antenna Array Adaptation" filed on Oct. 29, 2001. Each of the foregoing applications is incorporated by reference herein as though set forth herein in full.

BACKGROUND OF THE INVENTION

1. Field of the Invention

The present invention concerns wireless communications systems (e.g., cellular wireless systems) that utilize multiple transmit antennas, and is particularly directed to the problem of optimizing the signal weights applied to such multiple transmit antennas so as to increase total signal power at the receiver antenna.

2. Description of the Related Art

The capacity of a wireless radio frequency (RF) link or of an entire wireless network can be improved by using multiple transmit antennas, in the form of an antenna array. Generally speaking, the goal is for the transmission to be adapted such that the magnitude and phase of the sinusoidal radio carriers emitted from each transmit antenna add coherently at the receiver antenna (or multiple receiver antennas), hence providing a larger receiver power for a given total transmit power (as summed over all transmit antennas). This reduces the contribution of the transmission to the interference experienced by other receivers in the network, and therefore increases the system capacity. The adjustment of the magnitude and phase of the sinusoidal transmissions generally is represented as the application of a complex baseband weight vector, where the magnitude and phase of each complex element of the weight vector represents the magnitude and phase of the corresponding antenna transmission. Accordingly, such magnitude and phase adjustments are referred to herein as a set of complex weighting values or, alternately, as a weighting vector.

Various conventional techniques have been proposed for generating such weight vectors. However, such conventional techniques have a variety of problems, such as: being overly complex, requiring too much overhead in the form of feedback from the receiver, requiring too much processing at the receiver (which is a particular problem where the receiver is a mobile station in a wireless network), requiring too much transmit power to be dedicated to probing for better baseband weight vectors, and/or simply providing baseband weight vectors that are too far from the optimal solution. What is needed, therefore, are techniques that provide efficient antenna weighting vectors while still addressing the foregoing problems.

SUMMARY OF THE INVENTION

The present invention addresses this need, for example, by providing techniques in which a signal subject to perturbation weighting values is transmitted on a separate channel than a transmitted signal that is subject to the transmission weighting values.

Thus, in one aspect the invention is directed to the adjustment of antenna transmission weighting values in a communications system that utilizes multiple transmit antennas. A first signal is transmitted on a first channel via the multiple transmit antennas using a set of transmission weighting values. A second signal is transmitted on a second channel (different than the first channel) via the multiple transmit antennas using a set of perturbation weighting values. Then, a response that indicates at least one of: whether the set of perturbation weighting values should be added to the set of transmission weighting values and whether the set of perturbation weighting values should be subtracted from the set of transmission weighting values is received from a receiver of the first and second signals. Finally, a new set of transmission weighting values is generated based on the received response.

By transmitting a signal subject to perturbation weighting values on a separate channel than a transmitted signal that is subject to the transmission weighting values, the present invention often can reduce the amount of perturbation energy required to be transmitted. The following list highlights certain additional novel features of the present invention:

- transmitting perturbation vectors with normal multiplexing techniques, such as described above
    - can be CDM (code division multiplexing), TDM (time division multiplexing), FDM (frequency division multiplexing), or any other
- employing dedicated perturbation vectors for each mobile unit
- employing common perturbation vectors for use by all mobile units
- applying a general probing pre-transmission emphasis of the perturbation which is transmitted in the probing portion of the invention
    - applying orthogonal pre-transmission correction
    - applying channel-autocorrelation-based pre-transmission emphasis
    - applying exponentiation and diagonal weighting of the pre-transmission emphasis matrix
- applying a general post-transmission emphasis of the perturbation which is used to update the weight vector in the weight vector update portion of the invention
    - applying channel-autocorrelation-based post-transmission emphasis
    - applying exponentiation and diagonal weighting of the post-transmission emphasis matrix
- estimating the channel autocorrelation for assistance in an adaptive antenna weight algorithm
    - estimating the channel autocorrelation using the transmission weights from the algorithm, including the diagonal weighting which ensures subspaces are not excluded from adaptation
    - using the mean angle of the channel paths and/or the angular spread of the channel paths to estimate the autocorrelation matrix through a parameterized technique
    - using position estimation data (e.g. from GPS or other) to assist in the adaptation, particularly through the calculation of an autocorrelation matrix estimate.

applying common feedback to all base stations in soft handoff, used by all base stations in the same way The foregoing summary is intended merely to provide a brief description of the general nature of the invention. A more complete understanding of the invention can be obtained by referring to the claims and the following detailed description of the preferred embodiments in connection with the accompanying figures.

DESCRIPTION OF THE PREFERRED EMBODIMENT(S)

1. Overview

Figure 1:
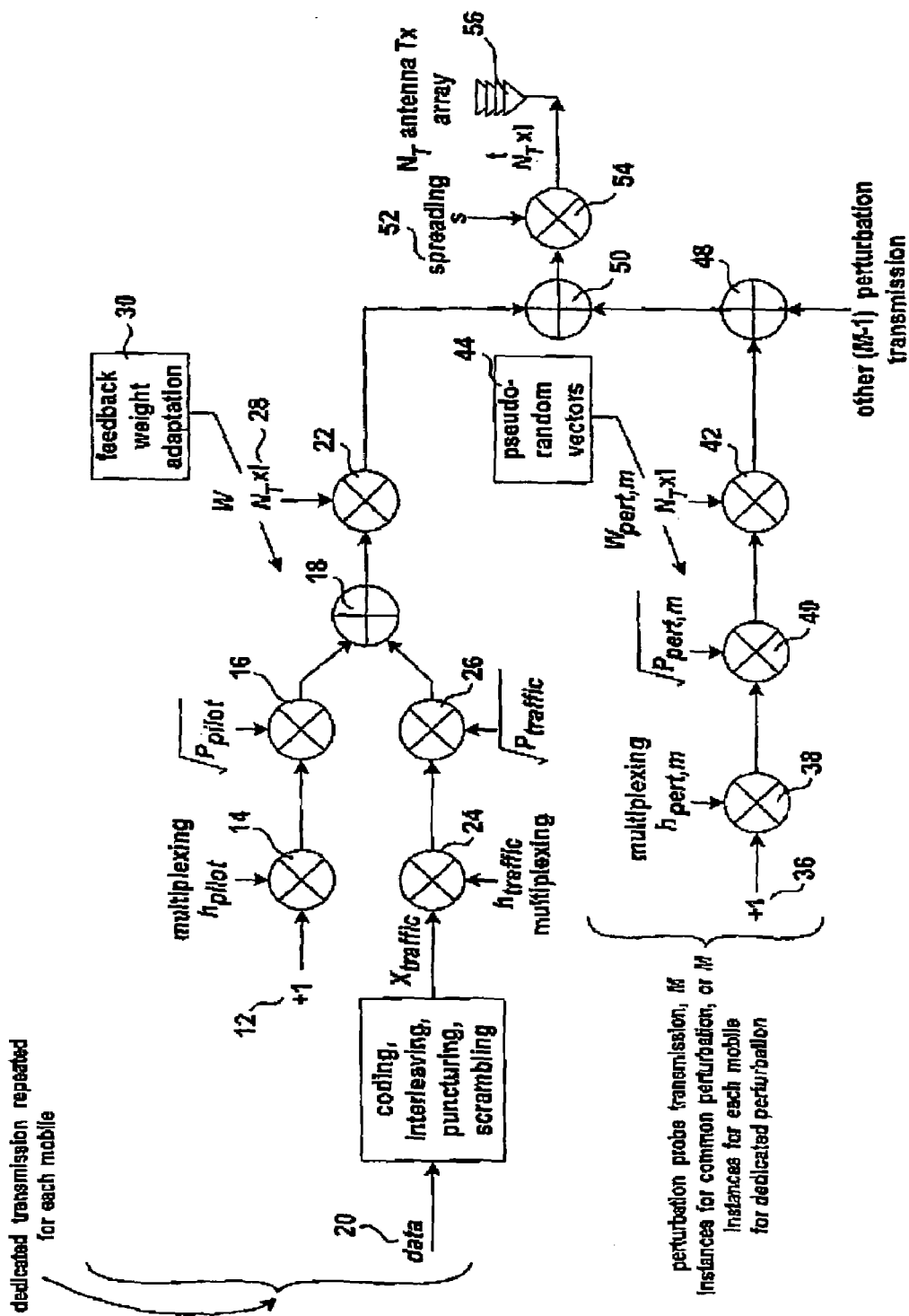
FIG. 1 is a block diagram illustrating a portion of the processing performed by a transmitter according to a representative embodiment of the present invention. Shown is the complex baseband equivalent, without explicitly shown radio frequency components.

The present invention concerns an adaptive complex baseband weight multiple antenna transmission system, using weight perturbation and binary feedback from a receiver to give the transmitter a coarse estimate of the gradient of the delivered power with respect to the baseband weights. The present invention includes, inter alia, a perturbation approach that applies perturbation vectors to a common pilot signal that is used by multiple receivers simultaneously, in addition to an approach where the perturbation is applied to the dedicated pilot signal used by a single receiver. The motivation for the common perturbation is that the application of dedicated perturbation vectors (for a single user, such as multiplexed on the dedicated pilot) requires transmission of some power for that perturbation. When multiple receivers are operating with the same transmitter (as in CDMA, Code Division Multiple Access) the perturbation can be applied on a common channel used by all receivers, which allows it to be transmitted at a greater power at less overall transmission cost, because only one such signal is transmitted for all receivers instead of one signal per receiver. The dedicated pilot channel is still required, but does not suffer the loss of power from the perturbation application.

The following description pertains to a cellular system, in which the transmission from the base station to the mobile station is termed the "forward link", and the transmission from the mobile station to the base station is termed the "reverse link". The mobile station is a mobile wireless terminal that uses the cellular network, while the base station is a fixed wireless terminal that communicates with the mobile station through the wireless channel and provides the link to the fixed hard-wired network. The multiple transmit antennas of the present invention are considered to be located at the base station. However, the techniques of the present invention also may be implemented at the mobile station and/or utilized in connection with non-cellular wireless systems.

The determination of transmit antenna weights is complicated by the fact that while the receiver can directly measure the channel, it is the transmitter that needs to have this information. Many systems are FDD (Frequency Division Duplex), so that the forward and reverse link radio channels are on different frequencies and therefore experience different channels, due to the different behavior of the scattering and reflection of the radio waves of different wavelengths. Hence, in FDD systems some other mechanism is required for the transmitting base station to gain knowledge of the forward channel. The present invention pertains to a feedback technique in which the mobile station transmits feedback bits to the base station, thereby allowing the base station to generate and utilize the appropriate transmission weights.

The feedback of the present invention takes the form of a bit (or several bits) that represents the decision as to the preferred update direction of the transmission weights, i.e., selecting a sign to apply to a perturbation vector prior to adding this vector (or a scaled version thereof) to the current weight vector. The perturbation vector is transmitted in such a way that the receiver can recover the composite channel gain of the perturbation vector and the channel vector, which is the perturbation-probing component of the invention. The mobile station then makes a decision regarding the feedback information to be sent back to the base station, based on the sign of the perturbation vector that would provide the greater received power if added to the weight vector, and transmits this information to the base station. The base station then updates the weight vector for that mobile station using such feedback information. The effect is that the transmitter obtains a coarse estimate of a gradient function, which is related to the channel in some useful way according to the specific implementation and which allows for a good adaptation strategy.

The transmission of the perturbation-probing vector can be dedicated (i.e., directed to a specific mobile station) or common (i.e., directed to all mobile stations). The dedicated probing vector can provide better performance for its corresponding mobile station, but typically requires more transmission energy because each mobile station requires the additional power of the perturbation transmission. The common probing vector, on the other hand, can save this additional power, because there is only one (or one set on perturbation transmission vector(s), instead of one per mobile station. The tradeoff between dedicated and common perturbation vector transmission depends on the system. For a classical DS-CDMA system where there are many receivers monitoring the same channel (e.g., voice users in IS-2000), the common perturbation strategy often will be the better one. In contrast, in systems with high data rates, in particular date rates many times larger than the physical channel variation bandwidth, the dedicated perturbation strategy will often be the preferred one.

Included in the present invention are several techniques to assist the adaptation of transmission weights and to provide enhanced system performance. These techniques include:

Projecting the probing perturbation vector orthogonally to the transmission weight vector In this way, the mobile station decides a preferred "direction", rather than having the possibility of selecting the perturbation application sign based on a change in "magnitude" of the current transmission-weighting vector. Because the transmission power is constrained, such a change in power would not actually be implemented in the base station anyway. In other words, the mobile cannot select a sign based on a radial change in the weight vector, as the weight vector is norm-constrained. This technique generally requires that the perturbation probing be dedicated, i.e. specific to the mobile station, as the projection orthogonal to the mobile station's transmit weight vector w must be based on the specific value of w Pre-emphasizing the probing perturbation vector with an emphasis matrix based on the forward channel autocorrelation The emphasis matrix that is used is related to an estimate of the autocorrelation matrix of the forward channel vector. The eigenvalues corresponding to the eigenspaces of this matrix provide a measure of how much of the forward channel vector energy falls within those eigenspaces. Hence, the eigenspaces with stronger eigenvalues can be emphasized in the perturbation probing because the channel vector is most likely to fall close to those eigenspaces. This generally requires that the perturbation probing be dedicated, i.e. specific to the mobile station, because the autocorrelation matrix estimate is specific to each mobile.

Post-emphasizing the perturbation vector with an emphasis matrix based on the forward channel autocorrelation This is similar to the probing pre-transmission emphasis technique, but the emphasis matrix is applied to the perturbation update after receiving the feedback. Because this is after the feedback, this allows for the perturbation probing to be common, i.e. the same perturbation probing transmission is used by all mobiles for their feedback decision generation.

Orthogonalizing multiple simultaneous perturbation vectors

When multiple simultaneous perturbation vectors are used (for multiple feedback bits per decision interval), generating these vectors to be orthogonal to each other ensures a better probing result. That is, the effective test points of the perturbation probing are more distant from each other and thus provide a better test. In some instances generating orthogonal vectors may be trivial (e.g., if vectors are generated from some fixed pattern of perturbation vectors rather than a pseudo-random approach), but in other cases this may require a specific technique for orthogonalization, such as Gramm-Schmidt (e.g. the random Gaussian perturbation vector generation described in the text).

For the matrix emphasis techniques, it should be noted that probing pre-transmission emphasis generally will provide better performance, where it is possible to do so. This gives rise to a potential tradeoff between such performance improvement and the additional cost of multiple dedicated transmissions.

2. Simple System Model and Objective

A simplified model for the transmission of a scalar signal x with a transmission conjugated weight vector w, where the channel (just a single time resolved path) is c, gives the received scalar r. With a transmission power P and a norm-constrained vector w, $\|w\|=1$, the received value is:

$$r = \sqrt{P} \cdot w^H c \cdot x \qquad \text{Eq. 1}$$

The objective is to maximize the power delivered to the receiver for a constrained transmit power P, because this optimizes the ratio of the received power to this user and the received interference to other users. The solution to this problem is:

$$w = \arg\left(\max_{\substack{w \\ \|w\|=1}} \left(|w^H c|^2\right)\right) = e^{j\phi} \frac{c}{\|c\|} \qquad \text{Eq. 2}$$

where $\phi$ is any arbitrary phase. Hence, the solution is any unit-norm, phase-rotated version of c, which has been call "pre-MRC", from the MRC (Maximal Ratio Combining) which is performed in receivers and has a similar form. This is a simplified model, where the results for multiple time-resolvable paths or multiple receive antennas are more complicated, but the general goal remains delivering the maximum power for a constrained transmit power.

3. Generalized Perturbation Feedback Extraction of Gradient Estimate

In this section, a general weighted gradient extraction is described. In this general form, if the pre-transmission emphasis matrix $\Phi_{(pre)}$ is mobile-specific then the perturbation transmission must be dedicated. That is, the perturbation transmission is tailored to a specific receiver, such that it is not useful to other receivers. Specific approaches for both dedicated and common transmission techniques are described in the following sections.

The following descriptions assume a DS-CDMA (Direct Sequence Code Division Multiple Access) implementation, but it should be understood that the techniques of the present invention may be used in connection with other communication systems as well.

The forward perturbation probing transmission is described in section 3.1. The operation of the receiver for generating feedback based on measurements of this transmission is described in section 3.2. The method by which the transmitter (e.g., base station) determines the perturbation weights and acts on the received feedback is described in section 3.3, and this is the area of the system which contains the most variation of embodiments.

3.1. Perturbation Probing Transmission

This section describes the transmission scheme which is used to extract the perturbation information through feedback. FIG. 1 illustrates the overall transmission scheme according a representative embodiment of the present invention. As shown in FIG. 1, a constant pilot signal 12 is multiplexed 14, scaled 16 to the appropriate power level, and combined 18 with communication data 20 that has been processed 22 (e.g., coded, interleaved, punctured and scrambled, as is well known in the art), multiplexed 24 and scaled 26 to the appropriate power level. In the present embodiment of the invention, the channel-coding is performed using code division multiplexing (CDM). However, any other channel-coding technique may be used instead. Both the pilot and data signals are then weighted 28 using a set of transmission weighting values 30 (i.e., one complex weighting value for each of the $N_T$ antennas). The determination of the set of transmission weighting values 30 is discussed in more detail below.

At the same time, a constant signal 36 is multiplexed 38 onto a different multiplex channel than the multiplex channels used for the pilot 12 and data 20 signals, and is scaled 40 to the appropriate power value. This signal is then weighted 42 by a set of perturbation weighting values 44

(i.e., one for each of the $N_T$ transmit antennas). Generation of the set of perturbation weighting values 44 is discussed in more detail below. However, as shown in FIG. 1, such values preferably are represented as a vector that is pseudo-random. Other properties of such vectors typically will depend upon the specific embodiment, as described below. The entire processing path 48 may be repeated in the event that multiple perturbation probing vectors are to be transmitted simultaneously, as described in more detail below.

The signals for each respective transmit antenna, the pilot signal 12, the data signal 20 and the perturbation signal 36 are then combined 50, a spreading code 52 is applied 54 (because the present embodiment assumes a CDMA implementation), and the signals are transmitted via their corresponding transmit antennas 56.

More specifically, the transmission to a single receiver is represented by the complex baseband equivalent vector t, where the magnitude and phase of the conjugated complex elements of t represent the magnitude and phase of the sinusoidal radio carriers transmitted from the antennas. (Conjugation at this stage makes some vector notation easier; if the transmission is of t* and the channel gain is c, then the received composite channel gain is simply $t^H c$, where the "H" superscript denotes the Hermitian, or conjugate transpose.) The vector t is of dimension $N_T \times 1$, where there are $N_T$ transmit antennas. A discrete time-sampled, time index n, representation of this vector is given by:

$$t*(n) = \left( w*\left(\sqrt{P^{(T)}_{traffic}} \cdot h_{traffic}(n) \cdot x(n) + \sqrt{P^{(T)}_{pilot}} \cdot h_{pilot}(n)\right) + \sum_{m=0}^{M-1} \sqrt{P^{(T)}_{pert,m}} h_{pert,m}(n) \cdot w_{pert,m}* \right) \cdot s(n) \quad \text{Eq. 3}$$

where w is the transmission weight vector applied to the traffic signal for this receiver, $w_{pert,m}$ is the weight vector applied as the $m^{th}$ perturbation probe transmission out of M such transmissions, and s(n) is any kind of spreading code or other modulation factor, as is commonly used in various forms of wireless communications. For DS-CDMA systems, s(n) represents a pseudo-random "chipping sequence" which spreads the occupied bandwidth. The figure shows the complex baseband model, and radio frequency modulation components are not shown.

In Eq. 3 above, x(n) represents the modulation due to the data 20, which is generally coded and interleaved according to standard wireless communications practice. In a DS-CDMA system, x(n) would include repetition, so that the value is constant over many samples n, because the data modulation bandwidth is less than the transmission bandwidth (which is spread by s(n)). The instances of h(n), differentiated by subscript, are the multiplexing factors applied to each signal. In general, the sequences h(n) are orthogonal to each other, although in some instances quasi-orthogonal functions are used. In DS-CDMA, the sequences h(n) are typically selected as Walsh-Hadamard codes. Other examples of multiplexing techniques for h(n) include rotating complex exponentials (i.e. generalized sinusoids) for FDM (Frequency Division Multiplex) or orthogonal slices of time for TDM (Time Division Multiplex). The values of $P^{(T)}$ represent the transmission power associated with each modulation stream, denoted by the subscripts. Note that this implies that all other scalars in the equation have an expected power of unity (e.g. they may have constrained unit magnitude) and that the weight vectors w and $w_{pert,m}$ are of unit-norm, i.e., $$\|w\| = \sqrt{\sum_i |w_i|^2} = 1.$$

A time index for the weight vectors w and $w_{pert,m}$ is not shown for simplicity of presentation, and these weights are constant over a perturbation probing measurement interval. These values are updated at a slower rate than the time index n, but they do change according to the adaptation, as described herein.

3.2. Receiver Feedback Decision Generation

In the preferred embodiment of the invention, the receiver operation is summarized as follows. The receiver estimates the forward channel gains of the traffic channel (using the traffic pilot sequence weighted with w) and the perturbation channel(s) (using the perturbation pilot sequence(s) weighted by $w_{pert,m}$). For each perturbation pilot, indexed m, the receiver decides from these estimates whether a differential (i.e., "infinitesimal") modification of the weight vector w in the positive or negative direction of the applied and measured perturbation would result in a larger received power, and generates the feedback bit to indicate that preferred direction.

A "RAKE finger" generally is applied in DS-CDMA receivers to demodulate individual time-resolvable delayed paths (reflections) of the received waveform. The demodulated outputs from each finger are combined, typically using "MRC" (Maximal Ratio Combining) or some variation of this, such that the received energy of each path is advantageously used for ultimate demodulation of the information bits. This description assumes such an implementation, but variations for other systems such as those that use equalizers is trivial. Feedback decisions in "soft handoff", a technique of DS-CDMA systems wherein multiple base stations simultaneously are transmitting the same information to a mobile station, is not described in detail explicitly but is performed the same way that the multiple time-resolvable paths are performed, as described below. That is, the channel gains of the traffic and perturbations from the multiple base stations and multiple paths are combined together, as in Eq. 11 below the same feedback bit(s) are sent to all base stations, and all base stations adapt to them in the same way.

Operation for a single receiver will now be described. Of course, multiple mobile station receivers simultaneously may be operating similarly, estimating either dedicated perturbation probe(s) or common perturbation probe(s), depending on the system architecture. Let the time resolvable multi-path channel delayed by l chips (in DS-CDMA a "chip" is one spreading sample, generally denoted at a Nyquist sampling rate such as the time index n used herein) to the mobile station be given by the $N_T \times 1$ vector $c_l$, then the waveform received by the mobile station is:

$$r(n) = \sum_{l=0}^{L-1} t(n-l)^H c_l + \text{(noise, interference,} \quad \text{Eq. 4}$$

other multiplexed orthogonal transmissions)

-continued $$\cong \sum_{l=0}^{L-1} t(n-l)^H c_l$$

$$= \sum_{l=0}^{L-1} \left( w^H c_l \cdot \left( \sqrt{P_{traffic}^{(T)}} \, h_{traffic}(n) \cdot x(n-l) + \sqrt{P_{traffic}^{(T)}} \cdot \right. \right.$$

$$h_{pilot}(n-l)) + \sum_{m=0}^{M-1} \sqrt{P_{pert,m}^{(T)}} \, h_{pert,m}(n-l) \cdot$$

$$w_{pert,m}^H c_l \right) \cdot s(n-l)$$

The noise, interference and other orthogonal transmissions are approximated as zero, not because they are small at this stage, but because they are small after the channel estimation stage, the residual terms inducing noise on the channel estimates.

The receiver then generates estimates of the received composite channels $\alpha_l$, given by the vector inner products $w^H c_l$, by standard correlation techniques used in CDMA systems with a pilot, where the sequence $h_{pilot}$s (which includes the spreading sequence and the Walsh, or other, multiplex channelization sequence) is known in the receiver (scaling factors to normalize the correlation summation omitted from the following). Specifically:

$$\hat{\alpha}_l = \sum r(n+l) \cdot h_{traffic} * (n) s * (n) \quad \text{Eq. 5}$$

$$\cong \sqrt{P_{pilot}^{(T)}} \, w^H c_l$$

$$\hat{\alpha}_{pert,m,l} = \sum r(n+l) \cdot h_{pert,m} * (n) s * (n) \quad \text{Eq. 6}$$

$$\cong \sqrt{P_{pert,m}^{(T)}} \, w_{pert,m}^H c_l$$

These summations are performed over the duration of the perturbation probing period, that is, the period of time in which the perturbation probing weight vectors $w_{pert,m}$ are held constant by the base station.

The feedback decision is then calculated in an equivalent manner to that of determining whether the total received power, summed over all the delayed paths I, would be greater with a differential step in the direction given by the perturbation response or in the opposite direction. That is, define the vectors:

$$a = \begin{bmatrix} \hat{\alpha}_0 \\ \hat{\alpha}_1 \\ \vdots \\ \hat{\alpha}_{L-1} \end{bmatrix} \quad \text{Eq. 7}$$

$$a_{pert,m} = \begin{bmatrix} \hat{\alpha}_{pert,m,0} \\ \hat{\alpha}_{pert,m,1} \\ \vdots \\ \hat{\alpha}_{pert,m,L-1} \end{bmatrix} \quad \text{Eq. 8}$$

Then the measured received pilot channel power of the receiver is the summation of all the path powers, $a^H a = \|a\|^2$. The test for a differential step in direction $a_{pert,m}$, denoted $\Delta a_{pert,m}$, then gives the update sign decision for the $m^{th}$ perturbation $d_m$ as:

$$d_m = \begin{cases} +1 & \text{if } \|a + \Delta a_{pert,m}\|^2 > \|a - \Delta a_{pert,m}\|^2 \\ -1 & \text{if } \|a + \Delta a_{pert,m}\|^2 < \|a - \Delta a_{pert,m}\|^2 \end{cases} \quad \text{Eq. 9}$$

For the differential step $\Delta$, this is:

$$d_m = \lim_{\Delta \to 0+} (\text{sign}(\|a + \Delta a_{pert,m}\|^2 - \|a - \Delta a_{pert,m}\|^2)) \quad \text{Eq. 10}$$

where the function sign(.) returns +1 for a positive argument and −1 for a negative argument. This decision is simply reduced to:

$$d_m = \text{sign}(\text{real}(a^H a_{pert,m})) \quad \text{Eq. 11}$$

That is, if the real component of $a_m^H a_{pert,m}$ is positive, then the receiver generates a positive indication, and if this real component is negative then the receiver generates a negative indication. Note that a realization with a zero-valued real component has zero probability with infinite precision, but in practice with a finite number of bits in a digital receiver it is possible that the real component is zero. In this case, the feedback decision direction can be arbitrarily selected by the receiver, as both directions are equivalent. The sign decision (or decisions) are transmitted after encoding into feedback bits. The traditional encoding of a bit from the binary sign information of d would be +1⇒0 and −1⇒1, but any convention can be applied. The mechanism by which the feedback is transmitted to the base station is not specified, as any of a number of mechanisms is possible.

Figure 2:
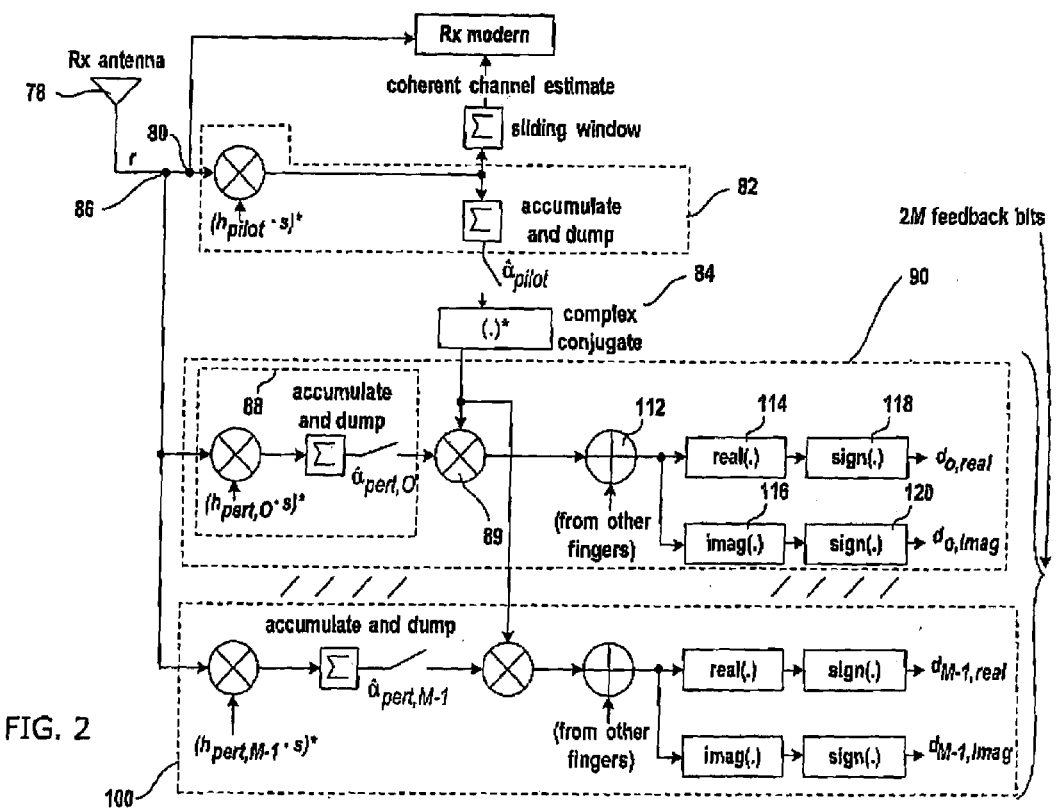
FIG. 2 is a block diagram illustrating a portion of the processing performed by a receiver according to a representative embodiment of the invention. Shown is the complex baseband equivalent, without explicitly shown radio frequency components.

An architecture for implementing the foregoing decision process is illustrated in FIG. 2. Specifically, the received signal 78 is demultiplexed 80 to obtain the pilot signal, which signal is then despread 82 and the complex conjugate taken 84. At the same time, the received signal 78 is demultiplexed 86 and then despread 88 to obtain the perturbation vector. This demultiplexing and despreading is performed for each of the sets of perturbation transmission weightings that were simultaneously transmitted by the transmitter (i.e., over different multiplex channels). Thus, an additional path 100, which is similar to path 90, is provided for each such additional set of perturbation weighting values.

In addition, the entire structure 110 is repeated for each RAKE finger. As a result, in adder 112, the outputs of each corresponding equivalent of multiplier 89 from all the different fingers are combined. The real 114 and imaginary 116 parts of the resulting signal are then resolved. The signs of such quantities are determined in elements 118 and 120, respectively. In the embodiment described above, only the signed bit of the real part is fed back to the transmitter. However, in embodiments described below, both bits for each separate set of perturbation weighting values are fed back to the transmitter.

3.3. Transmitter Perturbation Generation and Weight Vector Update

The perturbation weight vectors can be selected in numerous ways. As a general case, they may be randomly (more realistically, pseudo-randomly) generated from complex Gaussian vectors $p_m$. This is usually considered desirable from the standpoint that the directions of the vectors $p_m$ are uniformly distributed over all directions of the $2N_T$ (real and imaginary entries for $N_T$ antennas) dimensional space, so that the direction is truly unconstrained. True Gaussian variables cannot be produced numerically in digital systems, so that generally the vectors $p_m$ would be computed by a numerical approximation, such as are commonly used. Other implementations may be considered more desirable from the standpoint of complexity of system implementation, such as generating the real and imaginary entries as pseudo-random binary values, to give $(\pm 1 \pm j)$. Thus, the Gaussian technique should be understood to be merely representative.

In this embodiment, the weight vectors and perturbation vectors are time indexed i, which indexes the measurement intervals. These intervals are much longer than the chip time intervals indexed by n in Eq. 3. For example, in CDMA2000 systems the chip time is $1/1.2288$ MHz$\cong 813.8$ μs, while the most likely measurement/feedback interval would be 1.25 ms.

The perturbation vectors should yield an autocorrelation matrix of 2I. That is:

$$E(p_m p_m^H) = 2I \qquad \text{Eq. 12}$$

where E(.) is the expectation operator. The factor of 2 arises from the fact that each entry is complex. The autocorrelation of 2I represents a mean power per dimension of unity, where there are $2N_T$ dimensions from the complex entries for $N_T$ antennas. The foregoing relationship is not a fixed attribute of the system, but is a useful normalization for the purposes of mathematical description. This is equivalent to requiring the long-term average to be 2I., i.e., $$\lim_{N \to \infty} \left( \frac{1}{N} \sum_{i=0}^{N-1} p_m(i) p_m^H(i) \right) = 2I \qquad \text{Eq. 13}$$

Then, the perturbation probing weight vectors are generated as:

$$w_{pert,m}(i) = \frac{\Phi_{(pre)} p_m(i)}{\|\Phi_{(pre)} p_m(i)\|} \qquad \text{Eq. 14}$$

where $\Phi_{(pre)}$ is the pre-transmission emphasis matrix, which weights the perturbation prior to the probing transmission. The values for this matrix will be discussed later. This weight vector is asserted for the duration of one perturbation probing period (or a "measurement period") as was described in Eq. 3, and then is updated with a new randomly generated value of $p_m$. Because the feedback will be received only after some delay from this update, the old perturbation vector must be stored for application when the feedback is received and decoded at the base station.

When the feedback is received, represented here as a sign, $d_m = \pm 1$ (in this described embodiment, only the real bit of the feedback described in FIG. 2 is generated and transmitted by the mobile station, and utilized at the base station), for each perturbation, the traffic weight vector is updated with the corresponding perturbation vectors, as follows:

$$w(i+1) = \frac{w(i) + \beta \cdot \dfrac{N_T}{tr(\Phi_{(post)}) \left\| \sum_{m=0}^{M-1} d_m(i) w_{pert,m}(i) \right\|} \cdot \Phi_{(post)} \sum_{m=0}^{M-1} d_m(i) w_{pert,m}(i)}{\left\| w(i) + \beta \cdot \dfrac{N_T}{tr(\Phi_{(post)}) \left\| \sum_{m=0}^{M-1} d_m(i) w_{pert,m}(i) \right\|} \cdot \Phi_{(post)} \sum_{m=0}^{M-1} d_m(i) w_{pert,m}(i) \right\|} \qquad \text{Eq. 15}$$

Here, the matrix $\Phi_{(post)}$ is the post-transmission emphasis matrix, which is described more fully below. The parameter β is an algorithm parameter which defines the rate of adaptation, with a larger β generally giving a faster, but noisier, adaptation. The scaling of the update in Eq. 15 includes normalization of the cumulative perturbation weight decisions and of the emphasis matrix $\Phi_{(post)}$ to ensure that the amplitude of the update term (the summation over the post-transmission emphasized perturbation weight vectors) is completely defined by the parameter β. This normalization technique is considered preferred, but it must be recognized that this normalization technique, although preferred, is not required, and other normalization techniques are possible. The updated weight vector w(i+1) is explicitly normalized, so that the power relationship of $P_{traffic}^{(T)}$ in Eq. 3 is maintained.

Figure 3:
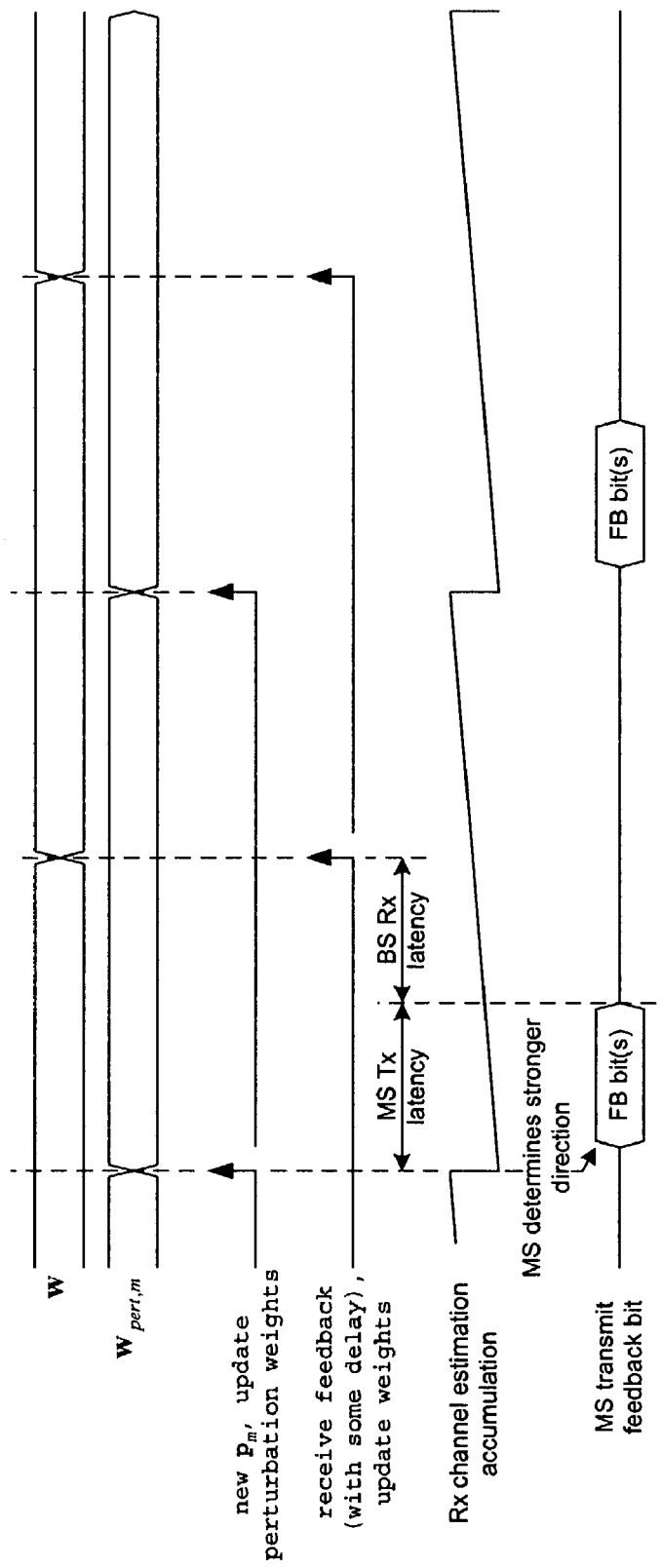
FIG. 3 is a sample timing diagram according to the present invention.

It must be noted that the times during which $w_{pert,m}(i)$ and w(i) are asserted at the antenna generally are not exactly the same. The application of w(i) lags the application of $w_{pert,m}(i)$ by an amount of time given by the latency of the feedback implementation. This latency is given by the delay in the mobile station estimation and feedback decision, the over-the-air propagation delay, the delay in the base station in receiving and demodulating the feedback information, and the delay in implementing the change at the base station. A representative timeline illustrating this is shown in FIG. 3.

In the most basic implementation, the emphasis matrices $\Phi_{(pre)}$ and $\Phi_{(post)}$ are identity matrices (I). Other alternatives are discussed in later sections.

4. Embodiments with Dedicated Perturbation Probing

The descriptions of section 3 above contained traffic, pilot and perturbation waveforms. The traffic and pilot waveforms are necessarily directed towards a specific mobile unit, because the traffic is assumed to be a dedicated data transmission (e.g., digitally encoded voice data) and the pilot must correspond to the weight vector w of that traffic transmission. However, the perturbation transmission can be either dedicated for that mobile unit or common, so as to be used by several mobile stations. In this section 4, embodiments which can be applied only with dedicated probing are considered. These are embodiments that apply a pre-transmission emphasis function that is specific to the particular mobile unit. In the preferred embodiment of the invention, this pre-transmission emphasis function is applied as a non-identity pre-transmission emphasis matrix (i.e. $\Phi_{(pre)} \neq I$) in some manner where $\Phi_{(pre)}$ is specific to the mobile unit.

If dedicated perturbation probing is used, then the system generally will perform better with all matrix emphasis applied prior to the probing (e.g., in $\Phi_{(pre)}$). Hence, for a dedicated perturbation probing system it generally is preferable to use no post-transmission emphasis, i.e. $\Phi_{(post)}=I$.

4.1. Perturbation Vector Orthogonal Projection

In the perturbation feedback techniques described herein, the mobile unit generates feedback based on the direction of the perturbation which, when applied to the weight vector, could result in a larger power. If not specifically addressed, it is possible that the perturbation vector will lie, at least in part, in the same radial direction as the weight vector. As a result, it might be that the addition and subtraction of the perturbation vector to and from the weight vector would result in a differential between the cases of addition and subtraction in the magnitude of the resulting weight vector. In the preferred embodiment, however, the weight vector is norm-constrained. As a result, this differential is undesirable because it could skew the decision made by the mobile unit. In other words, absent appropriate measures, it is possible that the mobile unit will select the greater magnitude, rather than the better "direction" for the weight vector. Projecting the perturbation vector orthogonally to the weight vector ensures that this corruption of the decision is not possible.

In this case, the pre-transmission emphasis matrix is selected as:

$$\Phi_{(pre)} = I - \frac{ww^H}{w^H w} \qquad \text{Eq. 16}$$

This is updated as soon as the weight vector is updated. As a result, it is time-varying, and it is not exactly synchronized to the updates in p. Accordingly, $w_{pert}$ must be updated both when p is changed and when w is changed. This can only be done with dedicated perturbation transmission because the orthogonalization is mobile-specific. Applying this emphasis after the feedback is received, in $\Phi_{(post)}$, is not helpful as the goal is to modify the basis of the mobile unit's decision. Applying this projection as a post-transmission emphasis $\Phi_{(post)}$ should not be done.

4.2. Channel Vector Autocorrelation Matrix Biasing

If the autocorrelation matrix of the forward channel vector is effectively estimated and is not equi-diagonal, then this knowledge can be used to assist the adaptation. The autocorrelation matrix has eigenvalues that correspond to eigenspaces (defined by the matrix's eigenvectors) and which provide some measure of "how much" of the channel vector lies in those eigenspaces in a statistical sense. For example, for a nullspace of the autocorrelation matrix the corresponding eigenvalue is zero, and if this is known then it is known that the channel vector cannot lie in this space, and allowing the weight vector to adapt to this space is merely allowing for the existence of unnecessary error.

Let the channel autocorrelation matrix R be summed over the L time-resolvable paths, so that:

$$R = E\left(\sum_{l=0}^{L-1} c_l c_l^H\right) \qquad \text{Eq. 17}$$

Let $\hat{R}$ be an estimate of this autocorrelation. Methods for generating this estimate will be discussed in a different section. Then, a preferred form of the autocorrelation matrix pre-biasing is given by setting:

$$\Phi_{(pre)} = \left((1-b)\frac{N_T}{tr(\hat{R})}\hat{R} + bI\right)^p \qquad \text{Eq. 18}$$

Here, $N_T$ is the number of transmit antennas, tr(.) is the trace of a matrix (the sum of the diagonals), b is an algorithm parameter which defines the amount of diagonal weighting, and p is an algorithm parameter which defines the amount of biasing. Applying the exponent p is herein referred to as "exponentiating" the matrix.

The reason for b is to ensure that there are diagonal components, so that even if there is a nullspace of $\hat{R}$ that eigenspace would still be exercised. That is important because if the autocorrelation matrix estimation is based on the transmit weight vector w, and the pre-transmission emphasis of Eq. 18 were to have a nullspace which precludes the adaptation in that nullspace, then the algorithm might never recover that nullspace. The algorithm generally should be capable of recovering a subspace because the channel statistics can vary over time. The value of b is set between 0 and 1.

The parameter p determines how strongly the weighting of the perturbation biasing in the eigenspaces is applied. When p is zero, the resultant matrix is identity, $\Phi_{(pre)}=I$, and no biasing is done. For the limit $p \to \infty$, no adaptation can take place and the weight vector simply assumes the value of the principle eigenvector of the autocorrelation matrix, which is the optimal static weight vector for a channel with that autocorrelation. The currently preferred choice for p is 0.5 or 1.

One general way to calculate the exponentiation (and to understand the effect on the eigenspaces) is to consider the eigendecomposition of the exponentiated matrix.

$$\left((1-b)\frac{N_T}{tr(\hat{R})}\hat{R} + bI\right) = Q\left((1-b)\frac{N_T}{tr(\Lambda)}\Lambda + bI\right)Q^H \qquad \text{Eq. 19}$$

where Q is the matrix of the eigenvectors of $\hat{R}$, and $\Lambda$ is the diagonal matrix of the eigenvalues of $\hat{R}$. Then the exponentiated result is:

$$\left((1-b)\frac{N_T}{tr(\hat{R})}\hat{R} + bI\right)^p = Q\left((1-b)\frac{N_T}{tr(\Lambda)}\Lambda + bI\right)^p Q^H \qquad \text{Eq. 20}$$

Hence, the matrix can be calculated by an eigendecomposition of the autocorrelation estimate plus the scaled identity, which results in real, positive eigenvalues, and then raising those real scalars (the eigenvalues) to some exponential power by any standard technique.

In addition to assuring exercise of all eigenmodes with the non-zero b, the diagonal weighting ensures numerical stability for whatever technique is used for the exponentiation, such as the eigendecomposition in Eq. 20, which can be important if the autocorrelation matrix estimate is poorly conditioned.

It is noted that the definition of an exponentiated matrix is not necessarily unique, and therefore other techniques could be applied. For example, the Cholesky decomposition could be applied in some cases for p=0.5. The eigendecomposition method is used because it is well defined for any value of p. Also, obviously for p=1 no effort is necessary.

4.3. Combined Pre-transmission Emphasis

The above-described techniques can be combined. In this case, the pre-transmission emphasis matrix would be:

$$\Phi_{(pre)} = \left(I - \frac{ww^H}{w^H w}\right) \cdot \left((1-b)\frac{N_T}{tr(\hat{R})}\hat{R} + bI\right)^p \quad \text{Eq. 21}$$

5. Embodiments with Common Perturbation Probing

In order to reduce the transmission power per mobile station, it is desirable in some cases to use common perturbation probing, where the same perturbation probing weight vectors are used by all mobile units. This eliminates the extra per-mobile power of the dedicated probing transmission. However, common perturbation probing generally does not allow for mobile-specific pre-transmission emphasis using $\Phi_{(pre)}$. Pre-transmission emphasis, as it can affect the mobile station's feedback decision in addition to the resultant weight update, generally performs better than post-transmission emphasis with $\Phi_{(post)}$, which generally does not change the nature of the decision. Hence, the decision to use common perturbation probing ordinarily is a tradeoff between the reduction in transmitted power and the reduction in tracking performance, a consideration which usually is system-specific.

With the exception of the perturbation emphasis approach, the description of the common perturbation probing is essentially unchanged from that of section 3. One must simply be aware that the traffic and traffic pilot transmissions are mobile-specific, while the same perturbation probing transmissions are used in common for multiple mobile stations.

5.1. Channel Vector Autocorrelation Matrix Biasing

Section 4.2 describes channel vector autocorrelation matrix biasing and why it is useful. Because the channel autocorrelation matrix is mobile-specific, in embodiments that utilize common perturbation probing, post-transmission emphasis generally must be used to account for such information. Hence, $$\Phi_{(pre)} = I \quad \text{Eq. 22}$$

$$\Phi_{(post)} = \left((1-b)\frac{N_T}{tr(\hat{R})}\hat{R} + bI\right)^p \quad \text{Eq. 23}$$

Calculation of the exponentiation of $\Phi_{(post)}$ would be the same as the calculation of $\Phi_{(pre)}$ in section 4.2 above.

5.2. Update Phase Change Minimization

This method of the invention is a modification to the update shown in Eq. 15. The relevant property of the weight vector is the "direction" of the vector in the $N_T$ dimensional complex space (2·$N_T$ dimensions when the 2 dimensions of the complex entries are considered). The complex phase of the vector is not relevant, i.e., the following are equivalent: $e^{j\theta}w \approx w$. When there is no orthogonal projection in the pre-transmission emphasis, i.e., the pre-weight $\Phi_{(pre)}$ of Eq. 16 is not used, it is possible for some excess phase change in the update to the new weights; i.e., a change of phase from the previous weight value to the new weight value which does not impact the new vector "direction". Because the direction is not impacted by this component of the update, this does not improve the resultant vector. However, the additional phase change can make estimation at the receiver more difficult. Because there generally is no benefit to the weight vector quality and there can exist a detriment to the receiver estimation process, it ordinarily is desirable to remove this excess phase change.

The modified update rotates the phase of the new weight vector to minimize the phase change seen at the receiver. The new update is shown in Eq. 24 and in Eq. 25, where a phase rotation multiplication is applied to the new weight. An intermediate value of w' is denoted with a "prime" mark.

$$w'(i+1) = \frac{\Phi_{(post)} \sum_{m=0}^{M-1} d_m(i) w_{pert,m}(i)}{\left\| w(i) + \beta \cdot \frac{N_T}{tr(\Phi_{(post)}) \left\|\sum_{m=0}^{M-1} d_m(i) w_{pert,m}(i)\right\|} \cdot \Phi_{(post)} \sum_{m=0}^{M-1} d_m(i) w_{pert,m}(i) \right\|} \quad \text{Eq. 24}$$

$$w(i+1) \Leftarrow \frac{w'^H(i+1) w(i)}{|w'^H(i+1) w(i)|} \cdot w'(i+1) \quad \text{Eq. 25}$$

This modified update ensures that the (Hermitian) inner product of the new weight vector with the old weight vector is real and positive, i.e. that the phase rotation has been minimized.

6. Estimating the Channel Vector Autocorrelation Matrix

This section 6 describes a technique for estimating the channel vector autocorrelation matrix.

6.1. Using Forward and Reverse Channel Vector Linear Estimation of Autocorrelation As noted in section 2 above, the adapted forward transmission preferably tracks the channel vector. Hence, this can be used to estimate the forward channel vector autocorrelation matrix. At the same time, if the same antennas are used by the base station for reception on the reverse link as for transmission on the forward link, then the vector of received waveforms from those antennas can be used to estimate the reverse channel vector. In some situations, this information can be used to assist in the estimation of the forward channel vector autocorrelation. In particular, if the duplexing frequency offset is not too large and the antenna spacing is not too large, then the autocorrelation matrix of the forward and reverse link channel gain vectors will be approximately equal. Then the forward autocorrelation matrix estimate $\hat{R}$ is the weighted sum of a forward weight vector autocorrelation $\hat{R}_f$ and the reverse channel autocorrelation matrix estimate $\hat{R}_r$, or:

$$\hat{R} = a\frac{\hat{R}_f}{tr(\hat{R}_f)} + (1-a)\frac{\hat{R}_r}{tr(\hat{R}_r)} \quad \text{Eq. 26}$$

where a is an algorithm parameter selected to optimize the estimation, which depends on the environment and might be determined by measurements and calibration. In particular, a may be set to unity if the reverse channel autocorrelation matrix estimate is not available or is determined to not be useful for accurate estimation of the forward channel autocorrelation estimate (e.g. if the duplex frequency or antenna spacing is too large). If a is set to unity then the unnecessary associated calculations for the reverse channel would not be performed. The normalization by the trace ensures equal weighting is given to each.

The weight vector autocorrelation matrix estimate is given by:

$$\hat{R}_f(n) = \sum_{k=0}^{\infty} h_f(k) w(n-k) w^H(n-k) \qquad \text{Eq. 27}$$

and the reverse channel autocorrelation matrix estimate is given by:

$$\hat{R}_r(n) = \sum_{k=0}^{\infty} h_r(k) \hat{c}_r(n-k) \hat{c}_r^H(n-k) \qquad \text{Eq. 28}$$

where $\hat{c}_r(\ )$ is the based station's estimation of the reverse channel and $h_r(\ )$ and $h_f(\ )$ are causal estimation filters with unit DC gain so that:

$$\sum_{k=0}^{\infty} h_r(k) = \sum_{k=0}^{\infty} h_f(k) = 1 \qquad \text{Eq. 29}$$

A very likely choice, due to the simplicity, is an exponential filter given by:

$$h(k) = \begin{cases} 0 & k < 0 \\ (1-\lambda)\lambda^k & k \geq 0 \end{cases} \qquad \text{Eq. 30}$$

This gives a simple recursive update:

$$\hat{R}(n) = (1-\lambda)\hat{c}(n)\hat{c}^H(n) + \lambda\hat{R}(n-1) \qquad \text{Eq. 31}$$

Figure 4:
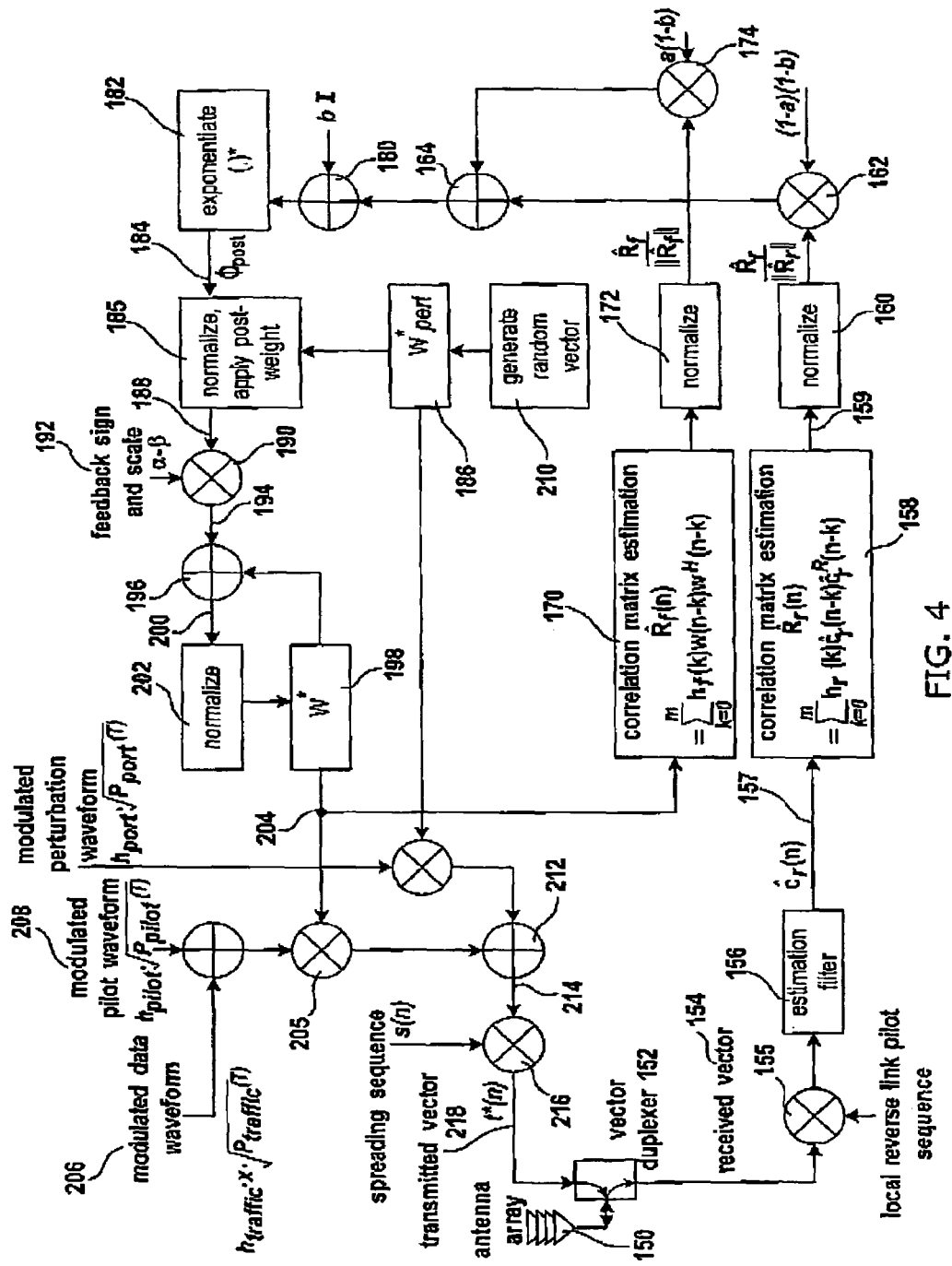
FIG. 4 is a block diagram illustrating additional functionality for a transmitter according to a representative embodiment of the present invention.

FIG. 4 illustrates a functional block diagram of a transmitter according to a representative embodiment of the present invention that implements post-transmission emphasis which includes emphasis based on the channel autocorrelation matrix, as described above.

As shown in FIG. 4, signals are transmitted and received via multiple antennas 150, under the control of duplexer 152. The received vector 154 (set of received signals corresponding to the multiple antennas 150) is de-multiplexed 155 and used to estimate 156 the reverse channel, using, e.g., known techniques. The reverse channel estimation 157 is then used to estimate 158 the reverse-channel correlation matrix 159, e.g., using Eq. 28. Matrix 159 is then normalized 160, scaled 162 by the factor (1−a)(1−b), and output to adder 164.

At the same time, the forward-channel correlation matrix is estimated 170, e.g., using Eq. 27, and this estimation is normalized 172, scaled 174 by the factor a(1−b), and output to adder 164. The output of adder 164 is added 180 to the matrix bI and exponentiated 182, as described above, in order to obtain a post-transmission emphasis matrix 184. This matrix 184 is then applied to 185 (i.e., multiplies) the perturbation weighting vector 186 that was used to obtain the mobile station response d (element 188) that is currently being processed. The resulting emphasized perturbation weighting vector 187 is then scaled 190 by β 192 and so as to alter its direction by 180°, if necessary, based on the mobile station response d 188. This vector 194 is then added 196 to the transmission weighting vector 198 that was used to obtain the response d 188, in order to obtain the new transmission weighting vector 200. Vector 200 is then normalized 202 and used as the new transmission weighting vector 204.

Vector 204 is thus applied 205 to the channel-multiplexed power-constrained traffic 206 and pilot 208 signals. At the same time, a random vector is generated 210 and conjugated 212 to obtain the new perturbation weighting vector 214, which is then applied 216 to a channel-multiplexed power-constrained signal 218 that is known to the mobile station. The foregoing antenna-weighted signals are then spread 220 and transmitted to the mobile station via antenna array 150, under the control of duplexer 152.

6.2. Using Direction of Arrival and Angular Spread Information

An alternative is to estimate the direction of arrival and angular spread of the arriving distribution of reflected radio waves, and calculate an autocorrelation matrix that corresponds to these parameters. This can be calculated in known ways, as there are formulas available in the literature. The direction of arrival information may be available from estimation using the reverse link, or from global positioning system (GPS) location monitoring, or any other such technique.

7. Alternative Embodiments

The following variations on the embodiments described above also are possible.

7.1. Complex Feedback Indication

In an alternate embodiment of the invention, the receiver generates two bits for each perturbation transmission, one indicating the preferred sign of a ±1 factor of the perturbation, the other bit indicating the preferred sign of a ±j factor of the perturbation, where j represents the imaginary number, i.e., $j=\sqrt{-1}$. If there is more than one feedback bit, it is preferred that this complex feedback implementation be used over the use of multiple perturbation transmission. That is, for B feedback bits, where B is an even integer, it is preferable to use complex feedback (2 bits per perturbation) with B/2 perturbation probe transmissions over using real feedback with B perturbation probe transmissions. This is because the same amount of feedback information is available with ½ of the transmission power used in the perturbation probe transmissions.

The two bits of complex feedback are generated for each perturbation probing pilot. The first is generated as in Eq. 11, denoted the "real" decision bit, as follows.

$$d_{m,real} = \text{sign}(\text{real}(a_m^H a_{pert,m})) \qquad \text{Eq. 32}$$

The second feedback bit is generated as follows.

$$d_{m,imag} = \text{sign}(\text{imag}(a_m^H a_{pert,m}))$$
$$= \text{sign}(\text{real}(-j \cdot a_m^H a_{pert,m})) \qquad \text{Eq. 33}$$

Then, the base station updates its weight vector with the two feedback bits for each perturbation probe (instead of just one bit, as portrayed in update Eq. 15) from Eq. 11 and Eq. 32. In this case, the decision is represented as a real component sign $d_{real}$ ($\pm 1$) and an imaginary component sign $d_{imag}$ ($\pm j$). The base station updates its transmission weight vector upon receiving these bits as follows.

$$w(i+1) = \frac{w(i) + \beta \cdot \frac{N_T}{tr(\Phi_{(post)}) \left\| \sum_{m=0}^{M-1} (d_{m,real}(i) - j \cdot d_{m,imag}(i)) w_{pert,m}(i) \right\|} \cdot \Phi_{(post)} \sum_{m=0}^{M-1} (d_{m,real}(i) - j \cdot d_{m,imag}(i)) w_{pert,m}(i)}{\left\| w(i) + \beta \cdot \frac{N_T}{tr(\Phi_{(post)}) \left\| \sum_{m=0}^{M-1} (d_{m,real}(i) - j \cdot d_{m,imag}(i)) w_{pert,m}(i) \right\|} \cdot \Phi_{(post)} \sum_{m=0}^{M-1} (d_{m,real}(i) - j \cdot d_{m,imag}(i)) w_{pert,m}(i) \right\|} \qquad \text{Eq. 34}$$

7.2. Weight Vector Update Formula Permutations

The update formula of Eq. 15 can be modified in several ways. Some examples are listed here. In addition, various mathematical representations are available which would have the same resultant implementation. Any formulation here could be easily applied to the complex feedback approach of section 7.1 above.

Explicit fixed normalization of the exact update added to the weight vector is given by:

$$w(i+1) = \frac{w(i) + \beta \cdot \frac{\Phi_{(post)} \sum_{m=0}^{M-1} d_m(i) w_{pert,m}(i)}{\left\| \Phi_{(post)} \sum_{m=0}^{M-1} d_m(i) w_{pert,m}(i) \right\|}}{\left\| w(i) + \beta \cdot \frac{\Phi_{(post)} \sum_{m=0}^{M-1} d_m(i) w_{pert,m}(i)}{\left\| \Phi_{(post)} \sum_{m=0}^{M-1} d_m(i) w_{pert,m}(i) \right\|} \right\|} \qquad \text{Eq. 35}$$

This generally provides inferior performance to Eq. 34 because the normalization over-represents the components of the post-weighted update, which may not conform to the receiver decision. That is, the normalization of Eq. 15 does not include explicit normalization of the realization of the post-transmission emphasis, and hence the normalization of Eq. 15 does not reinforce the distortion of the post-transmission emphasis.

Explicit normalization of the resultant update vector can be avoided altogether as follows:

$$w(i+1) = \frac{w(i) + \beta \cdot \frac{\Phi_{(post)}}{M \cdot tr(\Phi_{(post)})} \sum_{m=0}^{M-1} d_m(i) w_{pert,m}(i)}{\left\| w(i) + \beta \cdot \frac{\Phi_{(post)}}{M \cdot tr(\Phi_{(post)})} \sum_{m=0}^{M-1} d_m(i) w_{pert,m}(i) \right\|} \qquad \text{Eq. 36}$$

In this case the norm of the update may still be random depending on the way the perturbation vectors are generated. The expected value (mean) of the update is constrained, but each instantiation can vary. Normalization of the trace of the post-transmission emphasis matrix is still performed so that the update magnitude can be captured in the parameter $\beta$.

7.3. Explicit Orthogonalization of Multiple Perturbation Vectors

The distance of the effective probing "test points" which result from multiple perturbation probing vectors (i.e., M greater than 1 in Eq. 3 and elsewhere in this description) is increased by constraining these perturbation probing vectors to be orthogonal to each other. In this way, the vectors are not redundantly testing some of the same perturbation directions. In some instances generating orthogonal vectors may be trivial (e.g., if vectors are generated from some fixed pattern of perturbation vectors rather than a pseudo-random approach), but in other cases this may require some kind of orthogonalization, such as Gramm-Schmidt (e.g., the random Gaussian perturbation vector generation described above).

Denote the function $Q(.)$ as the unitary Q matrix of the standard QR representation of the Gramm-Schmidt orthogonalization technique (this Q is not the same as the eigenvector matrix of Eq. 19). Then, this approach can be done as follows. The perturbation weight vector generation of Eq. 14 is replaced with:

$$w_{pert,m}(i) = \frac{\Phi_{(pre)} p_m(i)}{\| \Phi_{(pre)} p_m(i) \|} \qquad \text{Eq. 37}$$

$$[w_{pert,0}(i) \ldots w_{pert,M-1}(i)] = Q\left(\left[ \frac{\Phi_{(pre)} p_0(i)}{\| \Phi_{(pre)} p_0(i) \|} \ldots \frac{\Phi_{(pre)} p_{M-1}(i)}{\| \Phi_{(pre)} p_{M-1}(i) \|} \right]\right)$$

Of course, other orthogonalization techniques or methods of generating p can be applied, and a different alternative applies the pre-transmission emphasis after orthogonalization, as follows:

$$[q_{pert,0}(i) \ldots q_{pert,M-1}(i)] = Q([p_0(i) \ldots p_{M-1}(i)]) \qquad \text{Eq. 38}$$

$$w_{pert,m}(i) = \frac{\Phi_{(pre)} q_m(i)}{\| \Phi_{(pre)} q_m(i) \|} \qquad \text{Eq. 39}$$

where the vectors $q_{pert,m}$ are simply intermediate variables for illustration.

7.4. Miscellaneous

The trace of a matrix (sum of diagonals) is used throughout for normalization of matrices. This is considered preferable as it is the most simple normalization to calculate. This implicitly assumes that the matrices applied (e.g. $\Phi_{(pre)}$, $\Phi_{(post)}$) are positive semi-definite and Hermitian symmetric, which is generally true for all embodiments described.

8. Advantages and Benefits of the Invention

The techniques of the present invention can provide the following benefits and advantages over conventional techniques:
- Flexible perturbation gradient technique for weight adaptation, which allows multiple optimizations at the base station.
- Flexible algorithm for transmit antenna weight adaptation with feedback
  - mobile does not need to know how many antennas are transmitting
  - mobile does not need to know how the base station uses the feedback (e.g. the pre/post-transmission emphasis matrices)
  - algorithm works in soft handoff without modification, combining the measurements from the several base stations to produce one set of feedback bits used by all base stations
- Flexible algorithm allows optimizations with pre/post transmission emphasis matrices
  - modify perturbation with pre-transmission emphasis which projects perturbation orthogonal to weight vector, to extract better feedback result
  - modify perturbation (either pre or post) according to the autocorrelation of the channel vector, to assist the adaptation, reducing noise in relatively inactive subspaces in order to accelerate tracking in the more active subspaces of the channel
  - other pre/post transmission emphasis techniques could be applied (not limited to those described). For example, nulling techniques (steering the transmission so that no power reaches some other mobile as interference) could be performed with appropriate pre/post transmission emphasis.
- Dedicated perturbation vector probing
  - allows for perturbation to be tailored to the specific mobile unit to obtain more useful feedback from the mobile unit and enhance tracking
- Common perturbation vector probing
  - allows for a single perturbation to be used for multiple mobile units, so that the power of the perturbation (seen as interference in the network at large) is generated only once for all mobiles rather than once for each mobile unit.
  - reduces overall perturbation transmission power, and hence interference in the network, thus increasing network capacity
  - because the perturbation probing is common, it can be at a higher power, giving more reliable feedback decisions from the mobile units.
  - reduced complexity of implementation at the base station, e.g., reduction in the MIPS (millions of instructions per second) associated with computing the perturbation vectors.
  - uses less bandwidth to multiplex the perturbations, because each transmitted perturbation must somehow be multiplexed (CDM, TDM, FDM) so that it is recoverable at the mobile unit, which occupies bandwidth. (In CDMA cases, this is the consumption of the available "Walsh space" of the Walsh-Hadamard codes).
  - using channel correlation to assist adaptation
    - can use position location (e.g. GPS) to assist knowledge of channel correlation.

9. Novel Features of the Invention

The following list highlights certain novel features of the present invention:
- transmitting perturbation vectors with normal multiplexing techniques, such as described above
  - can be CDM (code division multiplexing), TDM (time division multiplexing), FDM (frequency division multiplexing), or any other
- employing dedicated perturbation vectors for each mobile unit
- employing common perturbation vectors for use by all mobile units
- applying a general pre-transmission emphasis of the perturbation which is transmitted in the probing portion of the invention
  - applying orthogonal pre-transmission correction
  - applying channel-autocorrelation-based pre-transmission emphasis
  - applying exponentiation and diagonal weighting of the pre-transmission emphasis matrix
- applying a general post-weighing of the perturbation which is used to update the weight vector in the weight vector update portion of the invention
  - applying channel-autocorrelation-based post-transmission emphasis
  - applying exponentiation and diagonal weighting of the post-transmission emphasis matrix
- estimating the channel autocorrelation for assistance in an adaptive antenna weight algorithm
  - estimating the channel autocorrelation using the transmission weights from the algorithm, including the diagonal weighting which ensures subspaces are not excluded from adaptation
  - using the mean angle of the channel paths and/or the angular spread of the channel paths to estimate the autocorrelation matrix through a parameterized technique
  - using position estimation data (e.g. from GPS or other) to assist in the adaptation, particularly through the calculation of an autocorrelation matrix estimate.
- applying common feedback to all base stations in soft handoff, used by all base stations in the same way

10. System Environment

As indicated above, many of the methods and techniques described herein can be implemented at a base station in a wireless (e.g., cellular) communications system. The functionality described herein can be implemented using special-purpose hardware components or can be implemented with a general-purpose computer system. It will be appreciated that some of the components illustrated in the accompanying figures are standard components and can be constructed using known techniques.

A general-purpose computer for implementing techniques of the present invention typically will include, for example, at least some of the following components: one or more central processing units (CPUs), read-only memory (ROM), random access memory (RAM), input/output circuitry for interfacing with other devices and for connecting to one or more networks (which in turn may connect to the Internet or to any other networks), a display (such as a cathode ray tube or liquid crystal display), other output devices (such as a speaker or printer), one or more input devices (such as a mouse or other pointing device, keyboard, microphone or scanner), a mass storage unit (such as a hard disk drive), a real-time clock, a removable storage read/write device (such as for reading from and/or writing to a magnetic disk, a magnetic tape, an opto-magnetic disk, an optical disk, or the like), and a modem (which also may connect to the Internet or to any other computer network via a dial-up connection). In operation, the process steps to implement the above methods typically are initially stored in mass storage (e.g., the hard disk), are downloaded into RAM and then executed by the CPU out of RAM.

Suitable hardware for use in implementing the present invention may be obtained from various vendors. Various types of hardware may be used depending upon the size and complexity of the tasks. Suitable general-purpose computers include mainframe computers, multiprocessor computers, workstations, personal computers, and even smaller computers such as PDAs, wireless telephones or any other networked appliance or device.

Any of the functionality described above can be implemented in software, hardware, firmware or any combination of these, with the particular implementation being selected based on known engineering tradeoffs.

It should be understood that the present invention also relates to machine-readable media on which are stored program instructions for performing the methods of this invention. Such media include, by way of example, magnetic disks, magnetic tape, optically readable media such as CD ROMs and DVD ROMs, semiconductor memory such as PCMCIA cards, etc. In each case, the medium may take the form of a portable item such as a small disk diskette, cassette, etc., or it may take the form of a relatively larger or immobile item such as a hard disk drive, ROM or RAM provided in a computer.

11. Additional Considerations

In the embodiments described above, the perturbation vectors typically are generated on a purely random or pseudo-random basis. However, this is not critical. Instead, information known to the transmitter might be used to estimate the gradient direction. Such information might be received from the receiver as additional feedback (e.g., feedback indicating the magnitude of the channel gain corresponding to a particular perturbation vector or feedback indicating which of several different perturbation vectors resulted in the largest magnitude) and/or might be generated internally by the transmitter (e.g., based on prior consistency in the direction of changes to the antenna weighting vector). Then, the estimated gradient direction can be used to influence the selection of the perturbation vectors.

Similarly, rather than scaling the perturbation vector by a constant $\beta$ when modifying the antenna weight vector, as in the embodiments described above, information such as described in the preceding paragraph might be used to modify the value of $\beta$ (e.g., increasing $\beta$ where it appears that the specific perturbation vector corresponds to a strong gradient direction) and to apply different $\beta$s for different simultaneous perturbation vectors.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality may be ascribed to a particular module or component. However, unless any particular functionality is described above as being critical to the referenced module or component, functionality may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method for adjusting antenna transmission weighting values in a communications system that utilizes multiple transmit antennas, said method comprising:
    (a) transmitting a first signal on a first multiplex channel via said multiple transmit antennas using a set of transmission weighting values;
    (b) transmitting a second signal on a second multiplex channel via said multiple transmit antennas using a set of perturbation weighting values;
    (c) receiving, from a receiver of the first and second signals, a response that indicates at least one of: whether the set of perturbation weighting values should be added to the set of transmission weighting values and whether the set of perturbation weighting values should be subtracted from the set of transmission weighting values; and
    (d) generating a new set of transmission weighting values based on the response received in step (c),
    wherein the first channel is different than the second channel.

2. A method according to claim 1, wherein the response further indicates at least one of: whether the set of perturbation values, phase rotated 90°, should be added to the set of transmission weighting values and whether the set of perturbation weighting values, phase rotated 90°, should be subtracted from the set of transmission weighting values.

3. A method according to claim 1, wherein the second signal having plural signals, each weighted according to a different set of perturbation weighting values is transmitted in step (b).

4. A method according to claim 3, wherein the response received in step (c) is for each of said plural signals.

5. A method according to claim 1, wherein the first signal includes a pilot signal.

6. A method according to claim 1, wherein a different set of perturbation weighting values is transmitted over a different multiplex channel to each receiver in the communications system.

7. A method according to claim 6, further comprising a step of generating the set of perturbation weighting values based on an estimate of receive channel autocorrelation values.

8. A method according to claim 6, further comprising a step of generating a set of perturbation weighting values for each receiver, such that the set of perturbation weighting values for said each receiver is selected such that a corresponding vector is orthogonal to a vector corresponding to the set of transmission weighting values.

9. A method according to claim 6, further comprising a step of generating a set of perturbation weighting values for each receiver, such that the set of perturbation weighting values for said each receiver is based on an estimate of transmission channel autocorrelation values.

10. A method according to claim 6, further comprising a step of generating a set of perturbation weighting values for each receiver, such that:
(a) the set of perturbation weighting values for said each receiver is selected such that a corresponding vector is orthogonal to a vector corresponding to the set of transmission weighting values, and
(b) the set of perturbation weighting values for said each receiver is based on an estimate of transmission channel autocorrelation values.

11. A method according to claim 1, further comprising a step of generating the set of perturbation weighting values so as to ensure that a corresponding vector is orthogonal to a vector corresponding to the set of transmission weighting values.

12. A method according to claim 1, further comprising a step of generating the set of perturbation weighting values based on an estimate of transmission channel autocorrelation values.

13. A method according to claim 12, wherein the transmission channel autocorrelation values are based on a set of received responses.

14. A method according to claim 13, wherein the diagonal elements of a pre-weighting matrix are modified to ensure full rank.

15. A method according to claim 12, wherein the set of perturbation weighting values is based on a pre-transmission emphasis matrix that is generated by using the transmission channel autocorrelation values.

16. A method according to claim 15, wherein the pre-transmission emphasis matrix is exponentiated.

17. A method according to claim 12, wherein the transmission channel autocorrelation values are based on the set of transmission weighting values.

18. A method according to claim 16, wherein the transmission channel autocorrelation values utilize a linear time-based filtering of an outer vector product of a vector corresponding to the set of transmission weighting values.

19. A method according to claim 12, wherein the transmission channel autocorrelation values are based on at least one of an angle of arrival of a transmission channel path and an angular spread of plural physical transmission channel paths.

20. A method according to claim 1, wherein the set of perturbation weighting values transmitted in step (b) is common to all receivers in the communications system.

21. A method according to claim 1, wherein the new set of transmission weighting values is based on an estimate of transmission channel autocorrelation values.

22. A method according to claim 21, wherein the new set of transmission weighting values is based on a post-transmission emphasis matrix that is generated by using the transmission channel autocorrelation values.

23. A method according to claim 22, wherein the post-transmission emphasis matrix is generated by making modifications to diagonal elements of a post-weighting matrix to ensure full rank.

24. A method according to claim 23, wherein the post-weighting matrix is exponentiated.

25. A method according to claim 21, wherein the transmission channel autocorrelation values are based on the set of transmission weighting values.

26. A method according to claim 21, wherein the transmission channel autocorrelation values are based on at least one of an angle of arrival of a transmission channel path and an angular spread of plural transmission channel paths.

27. A method according to claim 1, wherein the new set of transmission weighting values is generated so as to reduce phase change with respect to the set of transmission weighting values.

28. A method according to claim 1, wherein the first channel and the second channel are different code division multiplexing channels.

29. A method according to claim 1, wherein said steps (a)-(d) are performed simultaneously at plural base stations in a cellular-based wireless communications system.

30. A method according to claim 29, wherein said simultaneous performance of said steps (a)-(d) is performed in connection with a soft handoff operation, and wherein the response received in step (c) is processed by said plural base stations in a similar manner.

31. A method according to claim 1, wherein the first signal and the second signal are predetermined.

32. A method according to claim 1, wherein each of the first signal and the second signal is a constant value.

33. An apparatus for adjusting antenna transmission weighting values in a communications system that utilizes multiple transmit antennas, said apparatus comprising:
(a) means for transmitting a first signal on a first multiplex channel via said multiple transmit antennas using a set of transmission weighting values;
(b) means for transmitting a second signal on a second multiplex channel via said multiple transmit antennas using a set of perturbation weighting values;
(c) means for receiving, from a receiver of the first and second signals, a response that indicates at least one of: whether the set of perturbation weighting values should be added to the set of transmission weighting values and whether the set of perturbation weighting values should be subtracted from the set of transmission weighting values; and
(d) means for generating a new set of transmission weighting values based on the response received by said means 1(c),
wherein the first multiplex channel is different than the second multiplex channel.

* * * * *